(12) United States Patent
Lindberg

(10) Patent No.: US 10,017,185 B2
(45) Date of Patent: Jul. 10, 2018

(54) METHOD FOR DAMPING ELECTROMECHANICAL OSCILLATIONS IN AN ELECTROMECHANICAL SYSTEM AND OSCILLATION DAMPING SYSTEM FOR EMPLOYING SUCH METHOD

(75) Inventor: Johan Lindberg, Göteborg (SE)

(73) Assignee: Volvo Technology Corporation, Göteborg (SE)

( * ) Notice: Subject to any disclaimer, the term of this patent is extended or adjusted under 35 U.S.C. 154(b) by 991 days.

(21) Appl. No.: 13/379,396

(22) PCT Filed: Jun. 22, 2009

(86) PCT No.: PCT/SE2009/000312
§ 371 (c)(1),
(2), (4) Date: Dec. 20, 2011

(87) PCT Pub. No.: WO2010/151179
PCT Pub. Date: Dec. 29, 2010

(65) Prior Publication Data
US 2012/0091934 A1 Apr. 19, 2012

(51) Int. Cl.
*H02K 29/06* (2006.01)
*B60W 30/20* (2006.01)
(Continued)

(52) U.S. Cl.
CPC ............ *B60W 30/20* (2013.01); *B60W 10/08* (2013.01); *B60L 2240/423* (2013.01);
(Continued)

(58) Field of Classification Search
CPC .... Y02E 10/725; B23K 9/1062; A63H 19/24; B60L 2240/421; Y02T 10/7275
See application file for complete search history.

(56) References Cited

U.S. PATENT DOCUMENTS 5,534,764 A 7/1996 Masaki et al.
5,537,967 A 7/1996 Tashiro et al.
(Continued)

FOREIGN PATENT DOCUMENTS

DE 4100937 A1 8/1991
DE 102005034794 A1 2/2006
(Continued)

OTHER PUBLICATIONS

Chinese Official Action (dated Sep. 18, 2014) for corresponding Chinese App. 200980160026.X.
(Continued)

*Primary Examiner* — Shawki S Ismail
*Assistant Examiner* — Zoheb Imtiaz
(74) *Attorney, Agent, or Firm* — WRB-IP LLP

(57) ABSTRACT

A method is provided for damping electromechanical oscillations in an electromechanical system including at least one electric machine operable with an angular speed and a phase of the angular speed being coupled to at least one torque load and producing an electromotive force. The method includes deriving actual values of the electromotive force and adjusting the phase of the angular speed, based on the derived actual values of the electromotive force, in a direction in which an oscillatory behavior of the electric machine is reduced.

11 Claims, 9 Drawing Sheets

(51) Int. Cl.
*B60W 10/08* (2006.01)
*B60W 20/00* (2016.01)

(52) U.S. Cl.
CPC ....... *B60W 20/00* (2013.01); *B60W 2710/083* (2013.01); *Y02T 10/642* (2013.01)

(56) References Cited

U.S. PATENT DOCUMENTS

| | | | | |
|---|---|---|---|---|
| 5,656,779 | A * | 8/1997 | Bronowicki | B06B 1/0261 536/24.3 |
| 6,574,535 | B1 | 6/2003 | Morris | |
| 7,199,540 | B2 | 4/2007 | Yaguchi | |
| 2002/0024317 | A1 * | 2/2002 | Amakusa | B62D 5/0487 318/782 |
| 2002/0060545 | A1 | 5/2002 | Inagaki et al. | |
| 2004/0222755 | A1 * | 11/2004 | Fariborzi | F16F 7/1011 318/114 |
| 2005/0002657 | A1 * | 1/2005 | Wu | H02P 7/29 388/831 |
| 2005/0167170 | A1 | 8/2005 | Hisada | |
| 2006/0030979 | A1 | 2/2006 | Kuang et al. | |
| 2007/0101965 | A1 | 5/2007 | Asahara et al. | |
| 2008/0297077 | A1 * | 12/2008 | Kovudhikulrungsri | H02P 21/22 318/400.02 |
| 2010/0204871 | A1 * | 8/2010 | Bange | H02M 3/156 701/31.4 |
| 2010/0204881 | A1 * | 8/2010 | Muragishi | F16F 7/1005 701/36 |
| 2011/0080122 | A1 * | 4/2011 | Klemm | A61C 17/221 318/129 |
| 2011/0083501 | A1 * | 4/2011 | Desroques | G01N 11/16 73/152.28 |
| 2012/0126157 | A1 * | 5/2012 | Beck | H02N 2/062 251/129.05 |

FOREIGN PATENT DOCUMENTS

| | | |
|---|---|---|
| EP | 2023007 A1 | 2/2009 |
| EP | 2040368 A1 | 3/2009 |
| GB | 2346351 A | 8/2000 |

OTHER PUBLICATIONS

International Search Report for corresponding International Application PCT/SE2009/000312.

Supplementary European Search Report (dated Nov. 8, 2016) for corresponding European App. EP 09 84 6600.

* cited by examiner

METHOD FOR DAMPING ELECTROMECHANICAL OSCILLATIONS IN AN ELECTROMECHANICAL SYSTEM AND OSCILLATION DAMPING SYSTEM FOR EMPLOYING SUCH METHOD

BACKGROUND AND SUMMARY

The invention relates to a method for damping electromechanical oscillations in an electromechanical system, particularly for damping electromechanical oscillations in an automotive electric or hybrid drive system such as for instance a hybrid vehicle, and an oscillation damping system for employing such method.

Electromechanical systems are frequently prone to exhibit torsional resonances that may cause torsional oscillations. A main cause is commonly mechanical spring-dampers that should mitigate higher frequency torque alternations to propagate throughout the system. However, in conjunction with an electric machine that is controlled by an electrical device connected to an electrical system, the mechanical system may interfere with the electrical system and the controls thereof. This can abate mechanical system damping properties. In order to mitigate such oscillations, it is common to apply damping control by utilizing the control device of the electric machine.

Oscillations in the drive system of a vehicle can have a detrimental effect on the vehicle.

In hybrid vehicles, for instance, comprising a combustion engine and an electric machine, the combustion engine as well as the electric machine can serve as drive sources. When switching from a purely electric drive mode to a drive mode with the combustion engine, the engine engagement invokes severe oscillations due to engine friction before the engine fires and the surge after the engine fires.

These oscillations are transmitted through the driveline and are ultimately felt by the occupants of the vehicle.

Oscillation control systems are employed for damping such or similar oscillations.

For instance, U.S. Pat. No. 5,537,967 discloses an oscillation damping system for a vehicle including a torque generator with given operation timing to produce a torque oscillation of a preselected frequency and an operation timing controller. The operation timing controller initially determines a phase difference between the engine revolution and the frequency of the vehicle oscillation formed of a resultant vector defined by a first oscillation component by movement of the crankshaft of the engine and a second oscillation component caused by movement of a piston of the engine. The controller then modifies the operation timing of the torque generator to provide the torque oscillation in an opposite phase relative to the vehicle oscillation based on the phase difference between these two oscillations and determined to compensate the vehicle oscillation.

GB 2346351 discloses a motor vehicle with a combustion engine comprising an electric machine which is used for actively damping oscillations due to torque changes caused by the combustion engine and by an engagement of the clutch.

It is desirable to provide an improved method for damping electromechanical oscillations in an electromechanical system which can be employed for electric machines operated in a saturated state, particularly for damping electromechanical oscillations in an electric or hybrid vehicle. It is also desirable to provide an improved oscillation damping system for damping electromechanical oscillations in such an electromechanical system.

A method according to an aspect of the invention is proposed for damping electromechanical oscillations in an electromechanical system, particularly in an automotive electric or hybrid drive system, comprising at least one electric machine operable with an angular speed and a phase of said angular speed, being coupled to at least one torque load and producing an electromotive force, comprising the steps of deriving actual values of the electromotive force; adjusting the phase of the angular speed, based on the derived actual values of the electromotive force, in a direction in which an oscillatory behaviour of said electric machine is reduced.

Typically, the unwanted electromechanical oscillations have a major impact mainly on the mechanical system connected to the electrical drive system.

The electromotive force is derived from the magnetic flux and the electrical angular speed of the electric machine and is a term used to characterize electrical devices, such as e.g. electrical generators. For a given device, if an electric charge passes through that device, and gains energy, the net electromotive force for that device is the energy gained per unit charge. For an electric machine, the source of electromotive force is electromagnetic induction. Because the electrical angular speed is a relation between the pole number of the electric machine and the mechanical angular speed, any oscillation apparent in the mechanical angular speed can also be observed in the electromotive force. The electromotive force can be calculated from the electrical angular speed and the pole number or can be measured or estimated via a state observer in the system.

The invention utilizes internal properties of the electric machine current control for altering the resonant electromechanical system. Favourably, the electromechanical oscillations in an electromechanical system can be damped. The system may comprise at least one controllable electric machine and at least one torque load which is connected to the electric machine by a mechanical spring-damper system which may have damping properties.

The invention is particularly useful for a control of an electric machine being operated in saturation due to torque limitation and/or voltage limitation. More particularly, the invention relates to commonly un-damped or poorly damped inherent electromechanical resonances encompassing a control unit comprising a torque control and current control of the electric machine and a mechanical system which comprises at least two systems of inertia interconnected by a spring system which may exhibit damping properties. In this sense, the electric machine consists of or comprises an electrical system describing the electrical properties, particularly an electric circuit, and a mechanical system of inertia describing the inertia of the electric machine. The other system of inertia may comprise an engine and/or other kind of torque loads such as wheels, a transmission etc.

The coupling between the control system of the electric machine, particularly the current control system, and the mechanical system, i.e. the systems of inertia and the mechanical coupling between these systems of inertia, creates a resonant system. Other than in prior art solutions which commonly address deviations in electrical and mechanical angular speeds, respectively, between the mechanically connected systems of inertia and which calculate an additional torque component which is added to the reference torque for improving the damping properties, the method according to the present invention changes an inherent coupling of the systems of inertia in a way that mitigates the oscillatory behaviour of the resonant system.

According to a favourable method step, the step of deriving the actual values of the electromotive force can comprise at least one of the steps:
- deriving said values from the calculated magnetic flux of said electric machine;
- deriving said values from the calculated electrical angular speed of said electric machine; and
- deriving said values from an estimation made by an observer of the state of the electric machine.

Particularly, the electrical angular speed can be calculated from values of a mechanical angular speed of said electric machine and a pole pair number of said electric machine. Such parameters are easily accessed in the electromechanical system comprising the electric machine.

According to a favourable method step, the step of deriving actual values of the electromotive force can be conducted in parallel to and independent from at least one of the further steps (i) of controlling a torque of the electric machine and (ii) of controlling any torque request. Favourably, limitations e.g. of current or torque which are valid for, and have to be observed by, this torque control segment have no impact on the performance of the method according to the invention.

According to a favourable method step, at least one of the steps (i) deriving actual values of the electromotive force and (ii) adjusting the phase of the angular speed can be performed by using a filter, in particular by using the filter for processing the step of deriving actual values of the electromotive force in form of a feed forward signal. Particularly, parameters of the filter can be set according to a simulation of the behaviour of the electric machine and/or the electromechanical system. Further, it is also possible that parameters of the filter can be varied adaptively during operation of the electric machine. Finally, it is also possible that one or more parameters of the filter belonging to a first group of parameters can be set according to a simulation of the behaviour of the electric machine and one or more of parameters of the filter belonging to a second group can be varied adaptively during operation of the electric machine.

Generally, "feed forward" is a term describing an element or pathway within a control system which passes a control signal from a source in the control system's external environment to a load in its external environment. A control system which is based on feed forward behaviour responds to its control signal in a pre-defined way without responding to how the load reacts; this is in contrast to a system that is based on feedback, which adjusts the output of the control system by taking into account how it affects the load, and how the load itself may vary unpredictably; the load is considered to belong to the external environment of the system. For a control scheme to be reliable by pure feed forward without feedback the effect of the output of the system on the load should be known which usually means that the behaviour of the load is assumed not to change with time in an unpredicted or unexpected manner. Once the control signal has been sent, it cannot be further adjusted. For corrective adjustment a new control signal must be sent.

Particularly, the feed forward signal can bypass a torque control segment of the control unit, i.e. the feed forward signal of the calculated electromagnetic force can be processed in the filter in parallel and independently of the processing of any torque request in the torque control segment of the control unit. Favourably, limitations e.g. of current or torque which are valid for, and have to be observed by, this torque control segment does not limit the feed forward signal of the calculated electromagnetic force and consequently have no impact on the performance of the method according to the invention. The respective control segments of the control unit can take the form of purely hardware or purely software or a combination of hardware and software. An inherent coupling of the systems of inertia is changed in a way that mitigates the oscillatory behaviour of the resonant system.

According to a favourable method step, a step can be performed further providing the feed forward signal as input to a current control segment in addition to at least one of a requested current derived from (i) a corresponding torque request, (ii) an electrical angular speed of the at least one electric machine, (iii) an actual current of the at least one electric machine. The feed forward signal can be provided to the current control segment in addition to at least one of requested parameters (i) requested current, (ii) electrical angular speed of the at least one electric machine, and (iii) actual current in the at least one electric machine. The feed forward signal of the electromotive force can be treated like a normal input signal to the current control segment of the control unit which sends an input signal, e.g. a pulse-width modulation (PWM) signal or a pulse-amplitude modulation signal or the like, to an inverter for operating the electric machine. The coupling between the current control and the electromechanical system via the electrical angular speed which is one of the main causes for oscillations in the system can be addressed in an appropriate way to diminish the oscillations in the system. The electromotive force can be provided as input to the control unit of the at least one electric machine as feed forward signal of the electromagnetic force, particularly the calculated electromagnetic force. In this case, an additional feedback loop is usually not needed. Besides the fact that such a feedback loop could be too slowly for the oscillation damping process in question, the feedback may also introduce other stability or resonant issues which can be avoided by using the feed forward signal (only).

According to a favourable method step, a step can be performed further comprising the step of forwarding control signals to an inverter coupled to the at least one electric machine. Thus the current applied to the electric machine can be adjusted to reduce or avoid an oscillatory behaviour. Expediently, the phase of the signals can be treated in a phase advancing way, i.e. shifted to a phase value ahead of the phase value of the electromotive force, or in a phase retarding way, i.e. shifted to a phase value behind the phase value of the electromotive force. Favourably, the filter employed for adjusting the phase of the angular speed basically effects the phase of the electromotive force signal. The shifted phase can be either shifted to phase values ahead or shifted to phase values behind, wherein the decision whether to shift the phase to phase values ahead or to phase values behind is advantageously based on the result of an analysis of the eigenvalues of the system. By analysing the eigenvalues, those filter parameters which are effecting the phase shift can be set so that the eigenvalue corresponding to the resonance has a negative real part.

According to a favourable method step, one or more parameters of the filter belonging to a first group of parameters can be set according to a simulation of the behaviour of the electric machine and/or the electromechanical system, and/or one or more parameters of the filter belonging to a second group can be adaptively varied during operation of the electric machine. Favourably, the behaviour of the system can be optimized during operation in a varying ambient and for varying operation conditions. The filter can be optimized to a broad operation range of the electric machine. When the filter parameters can be set according to the simulation of the behaviour of the electric machine and/or the electromechanical system, the filter can shift the phase of the signal by a predefined value and in a predefined direction. This method step is cost efficient and requires only minimum effort during operation of the electric machine.

According to another aspect of the invention, an oscillation damping system is proposed for employing a method for damping electromechanical oscillations, comprising a filter for processing at least one of the steps of (i) deriving actual values of the electromotive force and (ii) adjusting the phase of the angular speed, based on the derived actual values of the electromotive force, in a direction in which an oscillatory behaviour of said electric machine is reduced. Particularly, the filter can be connected to an input of a current control segment of a control unit.

According to a favourable embodiment, the filter can be connected in parallel to a torque control segment which provides an input signal for the current control segment. Favourably, the filter influences the phase of the electrical angular speed fed into the filter which outputs the electromotive force as a feed forward signal to a control unit controlling the electric machine.

According to a favourable embodiment, the filter can be connected to an input of a current control segment of the control unit. Particularly, the filter can bypass a torque control segment of the control unit which torque control segment provides an input signal to the current control segment corresponding to a requested current which is required to generate a requested torque of the electric machine.

According to a favourable embodiment, the filter can be arranged in parallel to a torque control segment. The torque control segment provides an input signal for the current control segment. By bypassing the torque control segment the torque and/or current limitations of the torque control segment do not limit the feed forward signal.

According to a favourable embodiment, the electric machine can be coupled to one or more torque loads characterized by a mechanical angular speed via a spring-damper system.

According to another aspect of the invention, a computer program is proposed comprising a computer program code adapted to perform a method or for use in a method according to at least one of the method features described above when said program is run on a programmable microcomputer. Particularly, the filter can be realized in hardware and/or in software. Preferably, the computer program can be adapted to be downloaded to a control unit or one of its components when run on a computer which is connected to the internet.

According to another aspect of the invention, a computer program product stored on a computer readable medium is proposed, comprising a program code for use in a method according to the invention on a computer.

BRIEF DESCRIPTION OF THE DRAWINGS

The present invention together with the above-mentioned and other objects and advantages may best be understood from the following detailed description of the embodiments, but not restricted to the embodiments, wherein is shown schematically.

DETAILED DESCRIPTION

Figure 1:
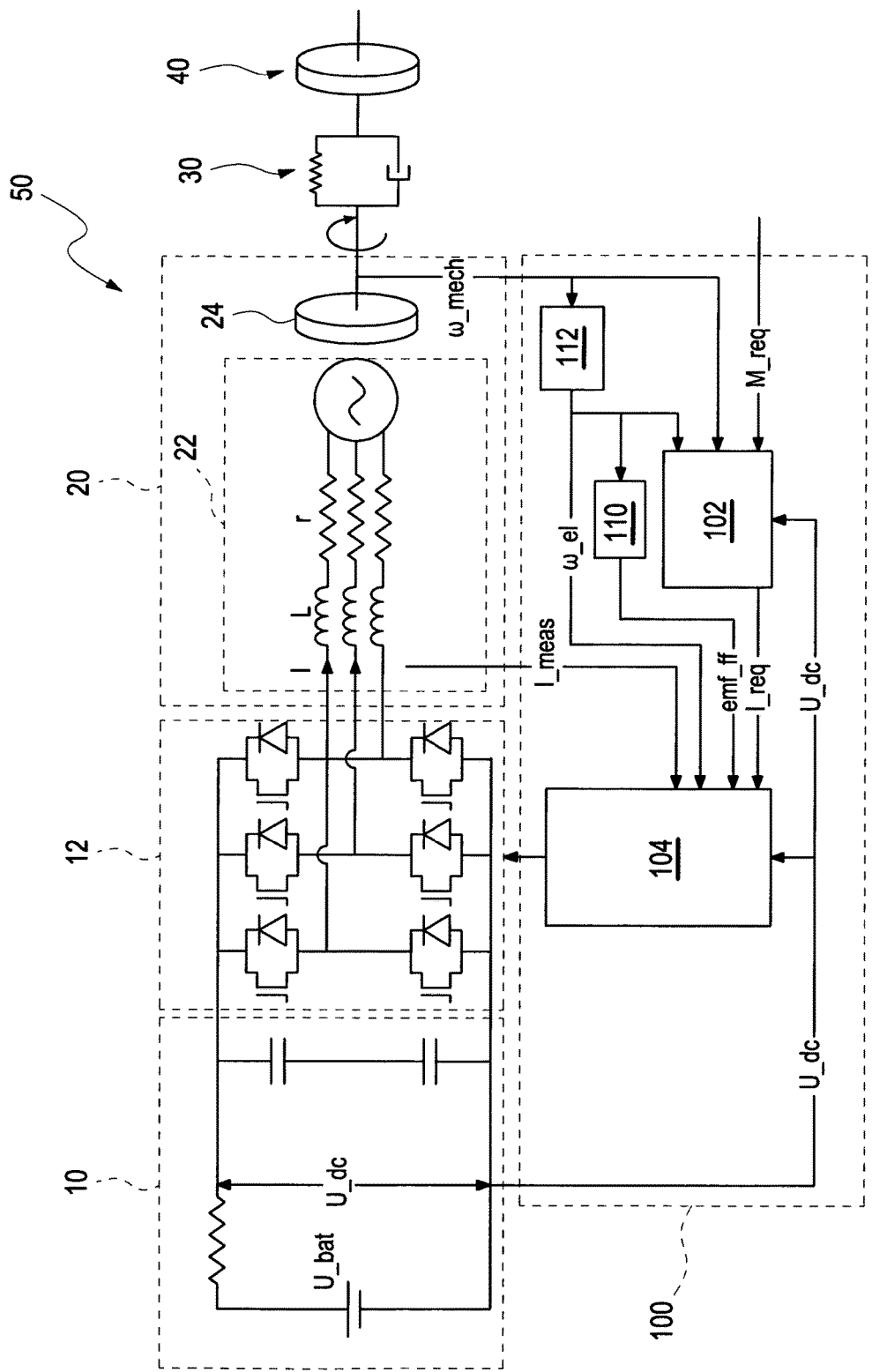
FIG. 1 an example of an electromechanical drive system according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1 depicts schematically an example embodiment of an electromechanical system 50 comprising a controllable electric machine 20. The electromechanical system 50 may be an electromechanical drive train of an automotive hybrid vehicle (schematically shown in FIG. 8). The electromechanical system 50 comprises a DC-voltage circuit 10 with a battery providing a battery voltage U_bat and supplying a supply voltage U_dc to an inverter 12. The inverter 12 supplies a current I to the electric machine 20. The DC-voltage circuit 10 supplies a DC voltage U dc to the electric machine 20. Control signal/sensor signal lines (indicated in form of arrows) are connecting a control unit 100 with the DC-voltage circuit 10, the inverter 12 and the electric machine 20. The control unit 100 controlling the DC-voltage circuit 10 senses the DC voltage U dc for controlling purposes. The DC-voltage supplied to boxes 102 and 104 indicates the measured voltage used for internal voltage U_dc used for internal limitations, such as saturation functionality, calculation of field weakening in the torque control, which is well known in the art.

In the Figure, a mechanical load connected to the electric machine 20 is modelled as a spring-damper unit 30 and a torque load 40 (for instance a combustion engine) as a general representation of any mechanical load. Other representations may be possible depending on the model used for describing such an electromechanical system. The electric machine 20 is mechanically coupled to the torque load 40 (such as the combustion engine (not shown)) by the spring-damper unit 30 which represents the mechanical and torsional properties as well as eventual damping properties of the connection between the electric machine 20 and the torque load 40.

The electric machine 20 comprises an electrical part 22 represented by an inductance L and a resistance r of the electric machine 20 and a mechanical part 24 represented by an inertia system of the rotating parts of the electric machine 20.

The inverter 12 receives input signals from the control unit 100. The electric machine 20 may be for instance a synchronous machine, e.g. a Permanent Magnet (PM) electric machine.

The control unit 100 encompasses several segments which can be embodied as hardware and/or as software in the control unit 100. Particularly, the control unit 100 may comprise a torque control segment 102, a controller 104 which contains a current control segment and a modulation segment (not shown in details), a filter 110 and a pole pair number segment 112 which contains information on the pole pair number of the electric machine 20.

The output of the control unit 100 is a modulated voltage signal depending on the inverter design, for instance a pulse width modulated signal (PWM signal), a pulse frequency modulated signal (PFM signal) or a pulse step modulated signal (PSM signal).

The torque control segment 102 receives a torque request M_req, e.g. derived from an accelerator position, and outputs a current signal I req to the controller 104 of the control unit 100. The accelerator may be an accelerator or gas pedal of the hybrid vehicle.

Additionally, the torque control segment 102 receives the mechanical angular speed ωjmech and the electrical angular speed ω_el as input signals. The electrical angular speed ω_el is a result of the mechanical angular speed ω_mech combined with the pole number of the electric machine 20 provided by pole pair number segment 112.

The torque control segment 102 may include a unit for achieving a field weakening of the electric machine 20 and includes limitations with respect to current and voltage applicable to the electric machine 20. Thus, the requested torque M_req is transformed by the torque control segment 102 to the requested current I_req inputted to the controller 104. By use of such control object as "field weakening" a reversed magnetic flux can be introduced which weakens a magnetic flux from the permanent magnets at high speed, which can be achieved by requesting a reactive electric current in the windings of the electric machine 20. If field weakening is not performed the electromotive force generated by the electric machine 20 may yield a voltage for the inverter 12 which might under certain conditions be too high for the converter 12 to control.

Additional to the current input I_req, the controller 104 receives as input a measured current I_meas of the electric machine 20 and the electrical angular speed ω el and a feed forward signal of the electromotive force emf_ff of the electric machine 20 supplied by the filter 110. The electromotive force signal emf_ff is used as a feed forward signal in the sense that the phase is adjusted in an open loop control instead of a closed loop control.

It should be noted that the controller 104 may act as a feedback controller for one or more input parameters such as the measured current I_meas and the like but that the electromotive force signal emf_ff is used as a feed forward signal inputted to the controller 104 so that the phase of the signal is not subject to feedback but by feed forward only.

The electromotive force signal emf_ff is derived from the mechanical angular speed ω mech and the pole pair number of the electric machine 20 and can either be calculated or can be estimated by use of a state observer. Input parameters for the electromotive force signal emf_ff are expediently the mechanical angular speed ω mech, the pole pair number and the permanent magnetic flux φ_m. It is possible, however, to use other parameters for estimation of the electromotive force signal emf_ff, depending on the model used, such as e.g. a change in the mechanical angle of the current in the electric machine 20, the geometry of the electric machine 20 and the rotor flux to make a similar estimate.

A state observer is a system that models a real system in order to provide an estimate of its internal state, given measurements of the input and output of the real system. It is typically a computer-implemented mathematical model. In case the electric machine 20 is a PM electric machine, the electromotive force emf_ff is for instance simply the product of the pole number and the mechanical angular speed ωjnech, the permanent magnetic flux φ_m and a filter function F.

The property of the phase shift is determined by the particular resonance frequency to be damped and the associated eigenvalue.

The filter 110 causes generally a phase shift of a signal which is fed into the filter 110. Particularly, the phase in a plot of a frequency versus a phase of the system can be shifted if for instance an oscillation of the mechanical angular speed ω_mech is observed in a model simulation of the electromechanical system.

Filter 110 can be a filter with fixed parameters which were set in advance according to the resonance behaviour of the electric machine 20. Filter 110 can be considered as a "feed forward filter". In this case the phase of the signal is shifted (by way of example) by a constant phase when processed by the filter 110. The filter parameters can be generated by model calculations in a design phase of the filter 110 and/or the control unit 100. Alternatively, the filter 110 can be an adaptive filter which changes its parameters during operation according to operation conditions of the control system 100 and/or the electric machine 20 and the interconnected mechanical system.

Figure 2:
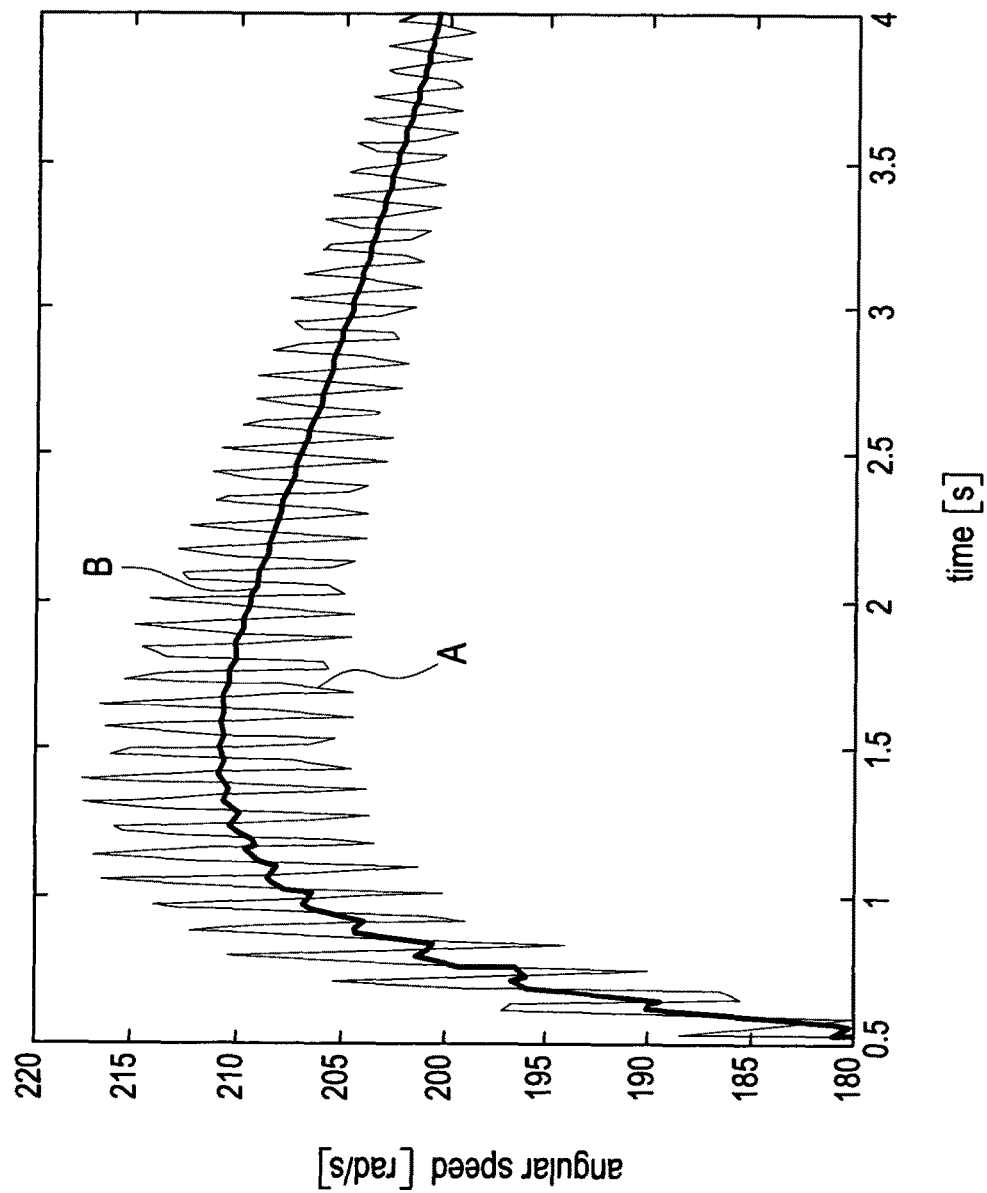
FIG. 2 angular speed curves with and without filtering of the angular speed.

FIG. 2 depicts angular speed curves as a function of time and illustrates the differences in mitigation of oscillations. Electromechanical systems are frequently prone to exhibit torsional resonances that may cause torsional oscillations. These oscillations are mainly caused by mechanical spring-dampers that should mitigate higher frequency torque alternations to propagate through-out the system. However, in conjunction with an electrical machine 20 that is controlled by an electrical control device 100 connected to an electrical system, the mechanical system may interfere with the electrical system and the controls thereof. The intrinsic mechanical system damping properties may be abated as a consequence. This effect is demonstrated by curve A in FIG. 2 showing a rather strong oscillating behaviour of the mechanical angular speed ω_mech of the electric machine 20. Particularly, curve A represents a case where no filter 110 (FIG. 1) is applied. Instead, some minor inherent damping is present resulting in a slight reduction of the oscillation amplitude with increasing time.

If the mechanical angular speed ω_mech of the electric machine 20 is strongly oscillating (as in curve A in FIG. 2), the electromotive force emf ff, being proportional to the product of mechanical angular speed ω_mech, pole pair number and permanent magnetic flux φ_m, will exhibit such oscillations, too.

However, according to the invention, by adjusting the phase of the mechanical angular speed ωjnech by use of the filter 110 (FIG. 1) it is possible to abate such oscillations. This effect is demonstrated by curve B in FIG. 2 showing, after a short start phase, a rather smooth curve whereby even slight oscillations in the mechanical angular speed ωjnech are virtually eliminated shortly after the start phase. As curve B in FIG. 2 shows, the unwanted oscillations decrease very quickly approaching virtually to zero after a rather short period of time.

Figure 3A:
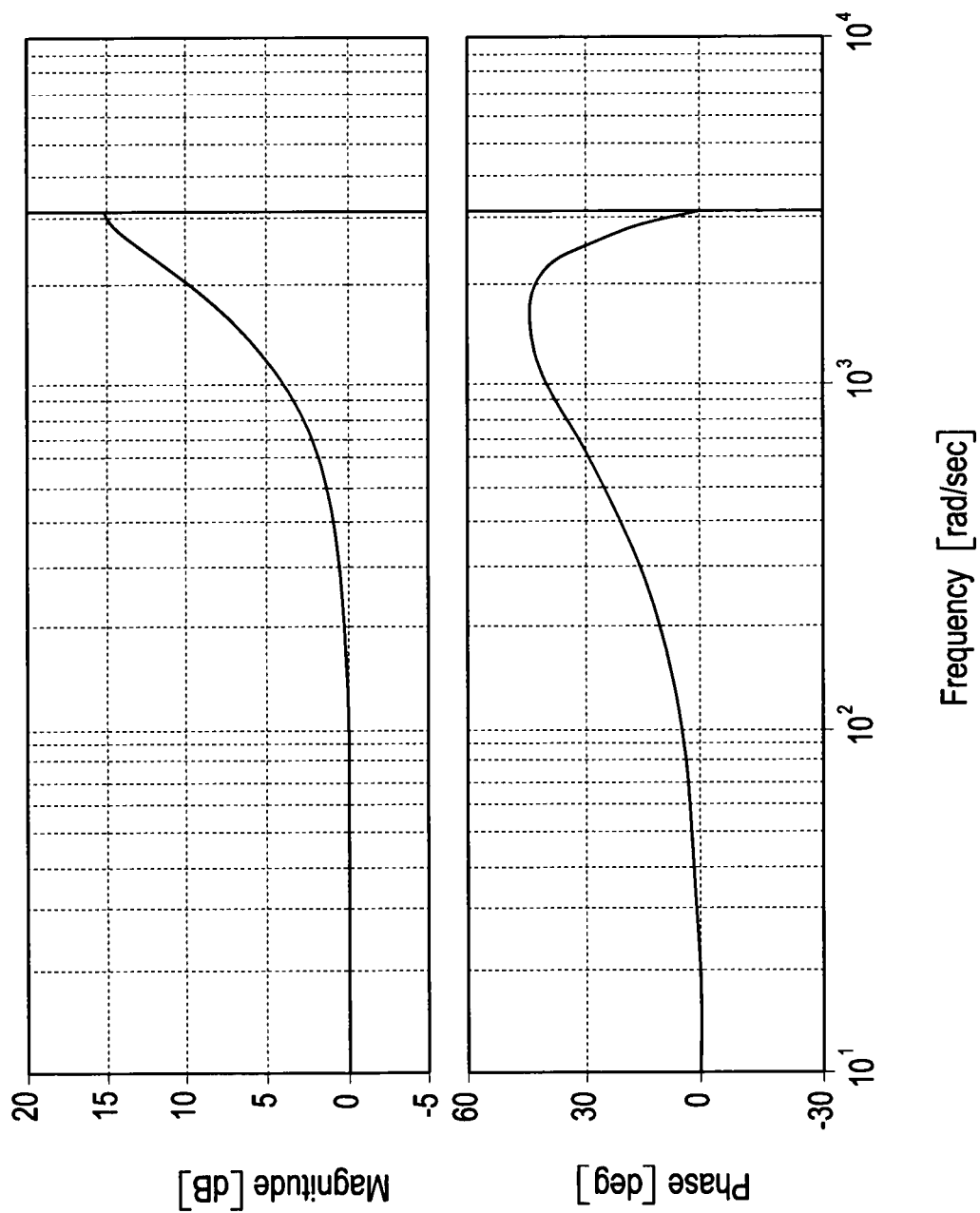
FIGS. 3a, 3b an example of amplitude and phase of a phase advancing filter represented by a Bode diagram (FIG. 3a) and two signals as a function of time indicating a phase advancement between an input signal to and an output signal of a phase advance filter (FIG. 3b)

For illustrating of the invention, FIG. 3a and FIG. 3b show the effect of filter 110 (as shown in FIG. 1). FIG. 3a depicts a so called Bode diagram. Generally a Bode diagram consists of two graphs identifying a complex transfer function, a graph indicating an absolute value of an amplification of an amplitude (called "magnitude" in the upper diagram in FIG. 3a) on a logarithmic scale, and a graph for an argument (called "phase" in the lower diagram in FIG. 3a) of the complex transfer function, both graphs plotted versus a frequency, plotted with logarithmic frequency axes, to show the transfer function or frequency response of a linear, time-invariant system, thus showing a stationary response of an output of a system to a harmonic input to the system.

In FIG. 3a the "magnitude" is displayed in units of dB, the "phase" is displayed in units of degree and the frequency is displayed in units of rad/sec. The Bode diagram in FIG. 3a shows that for frequencies above a certain frequency value these frequencies are magnified (i.e. the signals are increased in amplitude) but also that these frequencies are phase advanced. For a filter (110 in FIG. 1) the Bode diagram illustrates the filter parameter setting in the frequency plane. For the filter depicted in FIG. 3a, the magnitude (amplitude) of the filtered signal increases as a function of frequency while the phase of the filtered signal increases as a function of frequency until a maximum and then, at higher frequencies, decreases again.

Hence, as shown in FIG. 3b, an input signal that exhibits some frequency component which could be caused by a resonance, within this typical frequency region of the filter (110 in FIG. 1), will be phase advanced.

FIG. 3b shows by way of example the amplitude A of two sinusoidal signals S1 and S2 as a function of time t. The Figure shows how a signal S1 of a certain frequency will be affected by a filter with phase advancing characteristics resulting in the phase advanced signal S2. However, when such filter is applied within an electromechanical system 50 comprising a controllable electric machine 20 according to FIG. 1, the impact on the system 50 (FIG. 1) will be an attenuation effect (as shown by curve B in FIG. 2) that will be superimposed to the phase advancing effect of the filter.

More particularly, the amplitudes AMP of the two sinusoidal signals S1, S2 in FIG. 3b as a function of time t indicate a phase advancement between the input signal S1 to the filter with a phase advancing characteristic and the output signal S2 of said filter with filter characteristics as described by the Bode diagram in FIG. 3a. The phase advancement is seen as the corresponding time deviation between the input signal S1 and the filtered output signal S2 of the input signal S1, which corresponds to a phase displacement of the input signal S1, indicated by an arrow in FIG. 3b.

Figure 4:
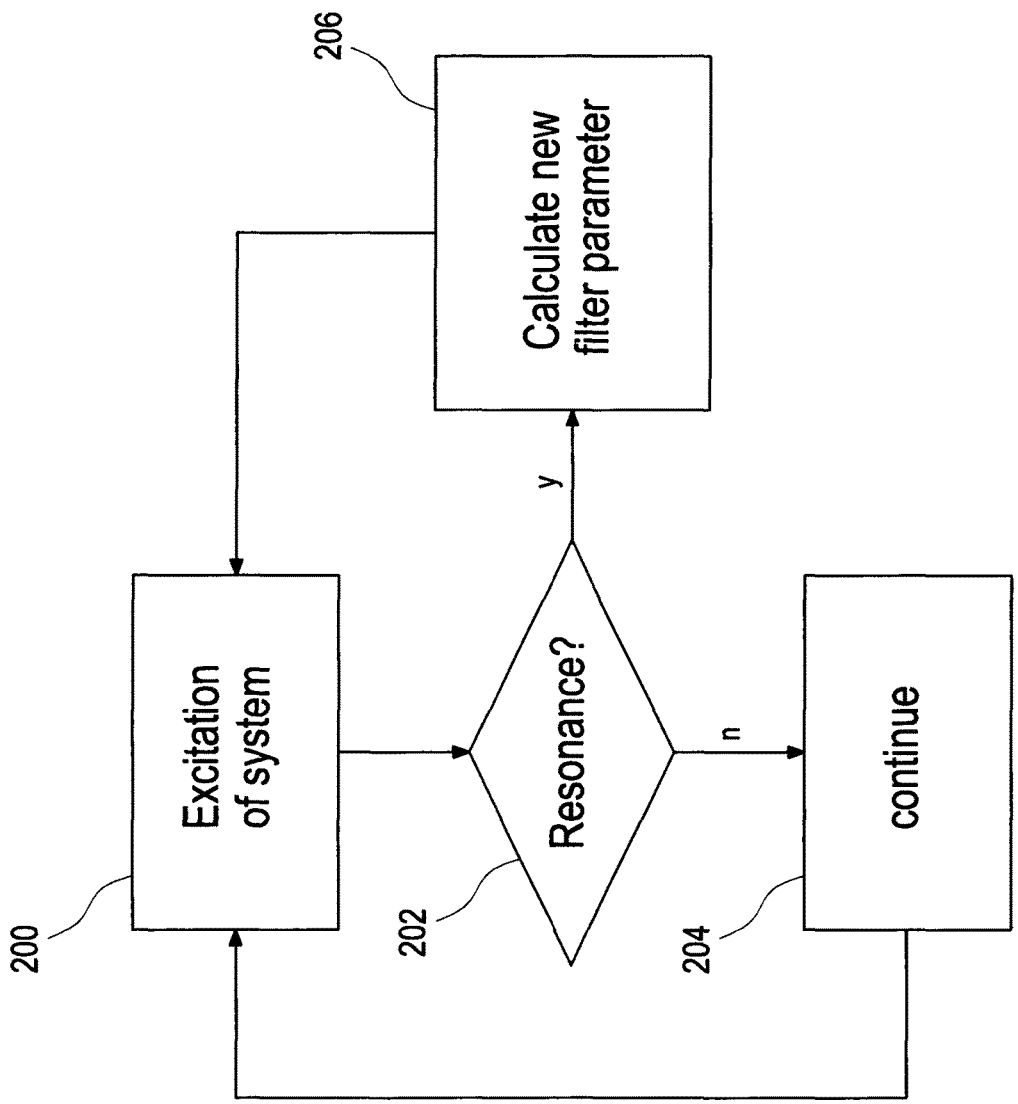
FIG. 4 a flow chart illustrating a filter parameter estimation problem.

FIG. 4 shows a flow chart illustrating a filter parameter estimation which is a possible basis for the embodiment of the invention shown in FIG. 1. The filter parameter estimation is done in a model phase in which filter parameters are calibrated before the implementation of the filter 110 in the real electromechanical system.

In step 200 in a simulation the system describing the electric machine 20 (FIG. 1) is excited from external disturbances or by a signal injection. The external disturbances can be introduced e.g. from the mechanical system connected to the electric machine 20 (FIG. 1).

In step 202 it is checked if any non-damped or poorly damped resonances are to be observed in the simulated system. If the answer is no ("n" in step 202) the normal operation is continued in step 204 until any disturbance, any unwanted excitation of the system or any change of work point of operation is observed.

Then the procedure jumps directly back to step 200. If the answer in step 202 is yes ("y" in step 202), the procedure continues with step 206, where, based on a concurrent analysis of the effect of the excitation on the system resonances, new filter parameters are estimated or calculated to achieve damping properties of the system. After this step, the routine continues with step 200.

Figure 5:
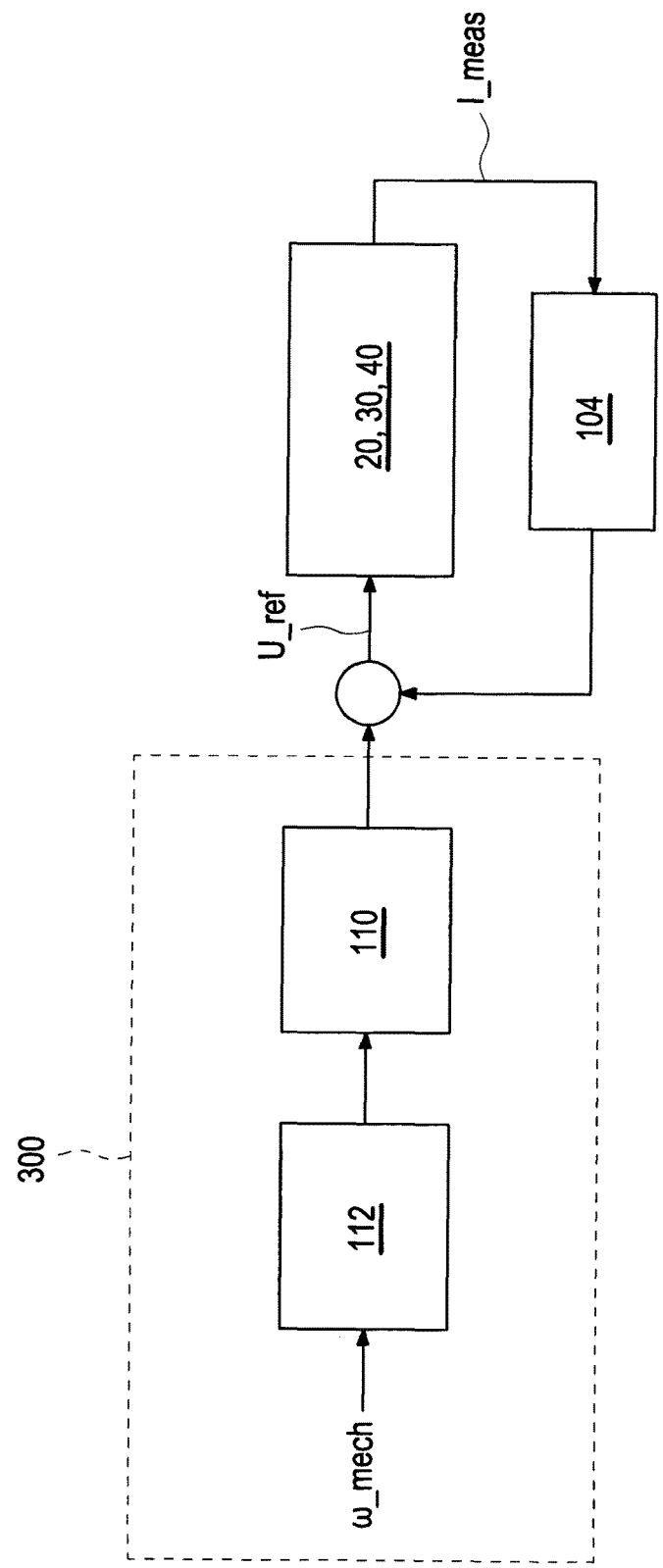
FIG. 5 a first embodiment for applying the method according to the invention employing pre-defined filter parameter setting.
Figure 6:
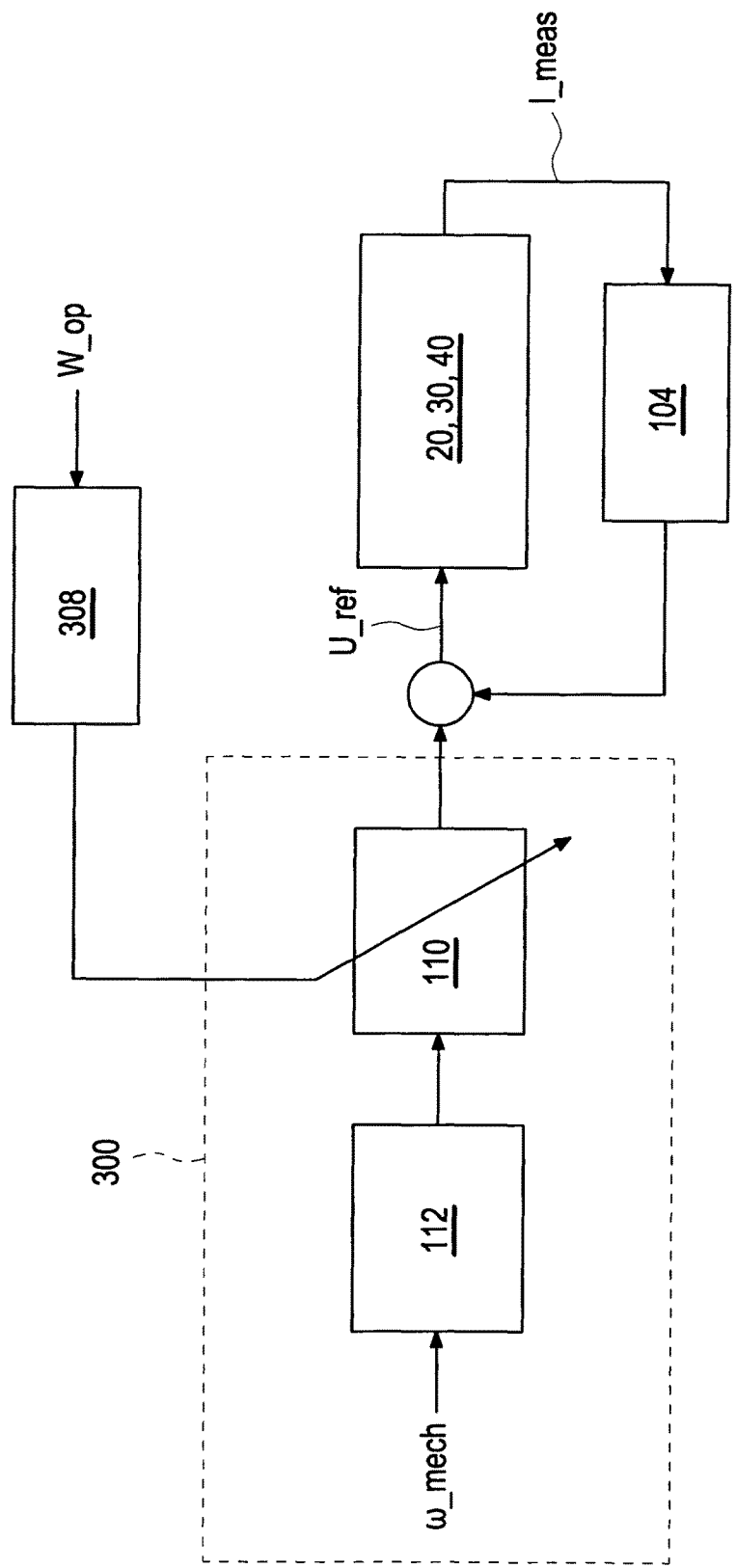
FIG. 6 a second embodiment for applying the method according to the invention employing a filter parameter setting based on gain scheduling.
Figure 7:
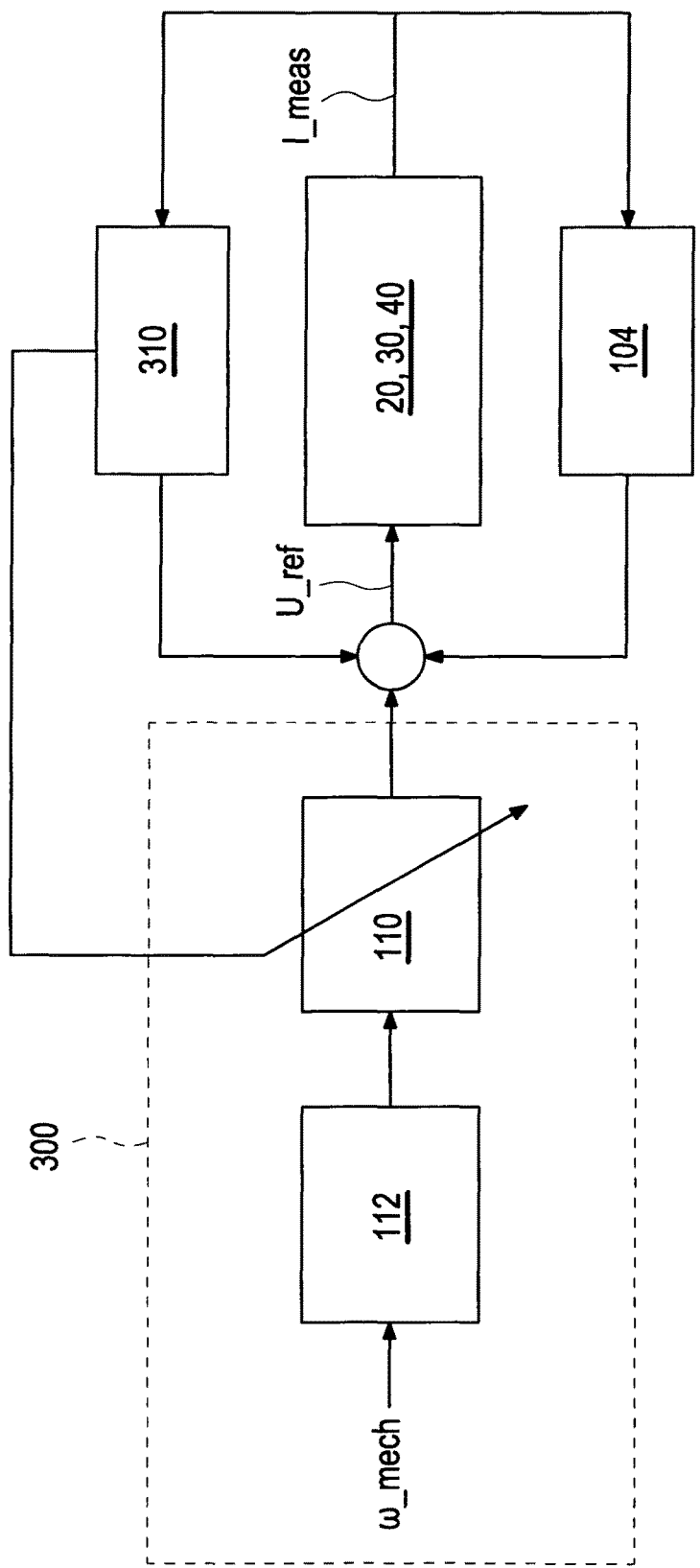
FIG. 7 a third embodiment for applying the method according to the invention employing an adaptive filter parameter setting.

FIGS. 5 to 7 illustrate three different embodiments how the invention can be employed, namely (i) with predefined filter parameters, (ii) with gain scheduling and (iii) with an adaptive filter.

Particularly, FIG. 5 depicts a block diagram of the action of a filter 110 according to a first embodiment of the invention, employing pre-defined filter parameter setting up the actual filter 110.

With reference to FIG. 1 and the components and their reference numerals described therein, the mechanical angular speed ω mech of the electric machine 20 is inputted into a disturbance model 300 which simulates the electromotive force emf_ff created by the electric machine 20. The mechanical angular speed ωjmech can be measured or estimated, the latter possibility allowing the number of necessary sensors to be reduced. The disturbance model 300 comprises the pole pair number 112 and the filter 110 characterized by a filter function F and the permanent magnetic flux φ_m of the electric machine 20.

The result of the disturbance model 300 is an input for a system 50 comprising an electrical machine 20 and mechanical parts 30 and 40 (as depicted in FIG. 1), wherein the input parameter for the system is a reference voltage U_ref. A controller 104 feeds the output signal of the system parts 20, 30, 40, i.e. a measured current Ijmeas of the system parts 20, 30, 40 back to the input of said system parts 20, 30, 40.

Figure 3:
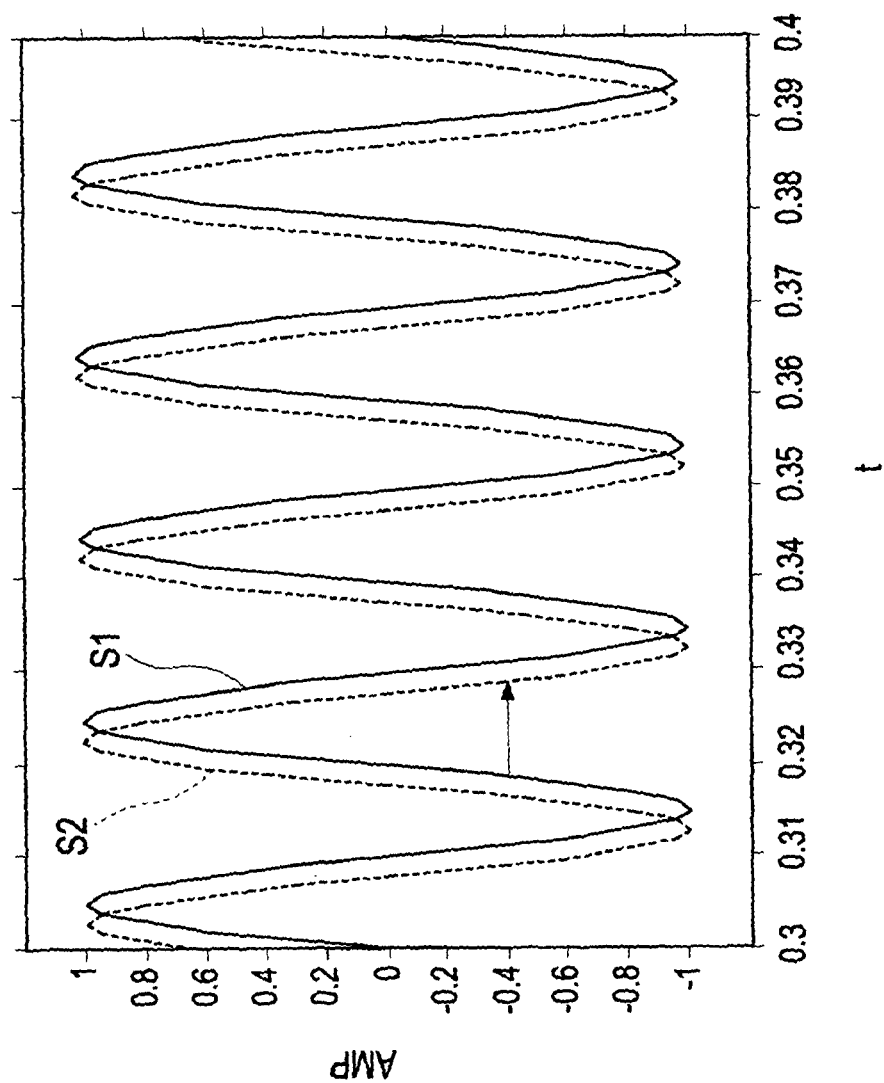

The filter 110 shifts the phase of the input signal ωjnech according to the predetermined fixed filter parameter set determined during a model phase of the electromechanical system as indicated in FIGS. 2 and 3.

In this embodiment, the filter 110 is designed to mitigate a certain resonance of the electric machine 20 known in advance in the development process designing the electromechanical system.

FIG. 6 depicts a block diagram of a second embodiment for applying the method according to the invention, employing a filter parameter setting based on gain scheduling. In the method of gain scheduling different sets of control parameters can be chosen dependent on operation points. For instance, in case of a vehicle for each gear shift and/or gear applied, during operation of the vehicle a parameter set can be read from a look up table which can be produced during an instant simulation of the electromechanical system.

With reference to FIG. 1 and the components and their reference numerals described therein, the mechanical angular speed ωjnech of the electric machine 20 is inputted into a disturbance model 300 which simulates the electromotive force emf_ff created by the electric machine 20. The mechanical angular speed ω_mech can be measured or estimated, the latter possibility allowing the number of necessary sensors to be reduced. The disturbance model 300 comprises the pole pair number 112 and a filter 110 characterized by a filter function F and the permanent magnetic flux φ_m of the electric machine 20.

The result of the disturbance model 300 is an input for a system 50 comprising an electrical machine 20 and mechanical parts 30, 40 (as depicted in FIG. 1), wherein the input parameter for the system is a reference voltage U_ref.

A controller 104 feeds the output signal of the system 20, 30, 40, i.e. a measured current ljneas of the system 20, 30, 40 back to the input of system 20, 30, 40.

The signal experiences a variable phase shift in the filter 110. The phase shift is varied depending on a predefined set of parameters for different system work points of operation provided by a gain scheduling block 308. The gain scheduling block 308 receives a work point of operation W op of the electric machine 20 as input, e.g. from a lookup table which contains parameters for operation modes known in advance. For instance, for each gear shift an appropriate parameter set is read and fed into the filter 110, thus altering the filter function F according to the actual operation mode of the electromechanical system (50 in FIG. 1).

If different operational modes alter the resonance frequencies of the electric machine 20, different sets of control parameters can be used to impose the mitigation. Which set of control parameters should be chosen depends on the actual mode of operation that in this case is known in advance and determined in the development process designing the electromechanical system.

FIG. 7 depicts a block diagram of a third embodiment for applying the method according to the invention, employing an adaptive filter parameter setting.

With reference to FIG. 1 and the components and their reference numerals described therein, the mechanical angular speed ω_mech of the electric machine 20 is inputted into a disturbance model 300 which simulates the electromotive force emf ff created by the electric machine 20. The mechanical angular speed ω mech can be measured or estimated, the latter possibility allowing the number of necessary sensors to be reduced. The disturbance model 300 comprises the pole pair number 112 and a filter 110 characterized by a filter function F and the permanent magnetic flux φ_m of the electric machine 20.

The result of the disturbance model 300 is an input for a system comprising an electrical machine 20 and mechanical parts 30, 40 (as depicted in FIG. 1), wherein the input parameter for the system is a reference voltage U_ref. A controller 104 feeds the output signal of the system parts 20, 30, 40, i.e. a measured current I_meas of the system parts 20, 30, 40 back to the input of the system 20, 30, 40.

A filter parameter estimation process block 310 receives input from the output of the system parts 20, 30, 40. The output of the filter parameter estimation process block 310 is combined with the combined output signals of the controller 104 and the filter 110 forming the input of the system parts 20, 30, 40. The filter parameter estimation process block 310 calculates a loss function for certain operation modes and calculates parameters to minimize these losses. In this embodiment, input and output parameters in the electromechanical system (50 in FIG. 1) are measured and/or estimated, and the filter function F of the filter 110 is adaptively adjusted, wherein an optimization algorithm calculates online the control parameters to be used for resonance mitigation, more particularly the filter function F of the filter part of filter 110.

Figure 8:
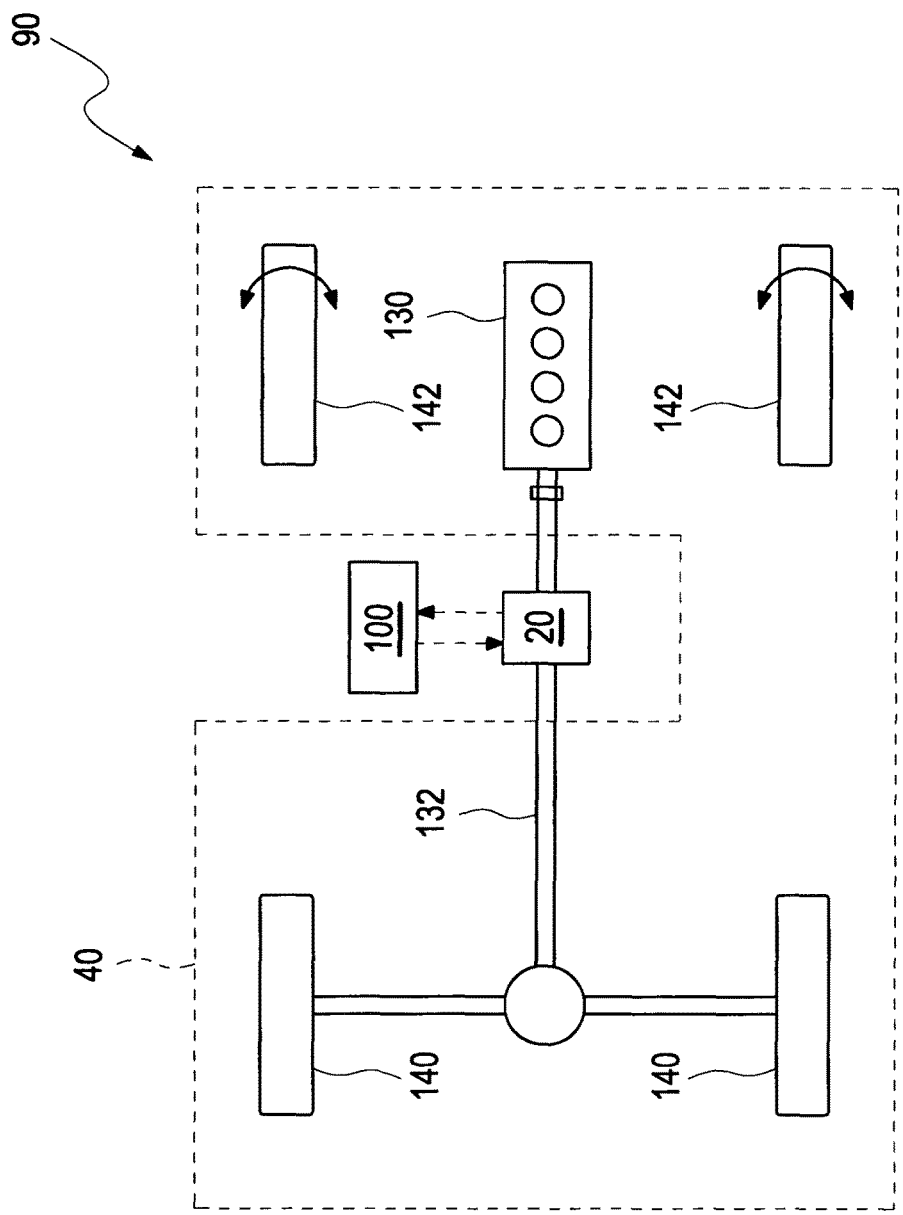
FIG. 8 a sketch of a drive system of a hybrid vehicle incorporating a system according to the invention.

A schematic representation of a vehicle 90 which employs the method according to the present invention is shown in FIG. 8. The vehicle 90 comprises in a well-known manner wheels 140 and 142 in the back and the front of the vehicle 90. A drive axle 132 is coupled to an internal combustion engine 130 via an electric machine 20. The drive axle 132 is coupled to the wheels 140. The vehicle wheels 140, 142 and the engine 130 are main parts in the mechanical system of the vehicle drive train (represented by numeral 40 in FIG. 1).

The electrical machine 20 is controlled by a control unit 100 which employs the method according to the invention.

The invention claimed is:

1. A method for damping electromechanical oscillations in an electromechanical system comprising at least one electric machine being coupled to at least one torque load and producing an electromotive force, comprising the steps of:
    deriving actual values of the electromotive force to provide an electromotive force signal;
    filtering the electromotive force signal in a filter to provide a feed-forward electromotive force signal, the filter providing a phase shift in a frequency region corresponding to a resonance frequency of the electromechanical system; and
    using the feed-forward electromotive force signal in an open-loop control of the electric machine to damp electromechanical oscillations in the electromechanical system,
    wherein the step of deriving the actual values of the electromotive force comprises at least one of
    (i) deriving the values from a calculated magnetic flux of the electric machine,
    (ii) deriving the values from a calculated electrical angular speed of the electric machine, and
    (iii) deriving the values from an estimation made by an observer of the state of the electric machine, and
    wherein the electrical angular speed is calculated from values of a mechanical angular speed of the electric machine and a pole pair number of the electric machine.

2. The method according to claim 1, wherein the step of deriving actual values of the electromotive force is conducted in parallel to and independent from at least one of the further steps (i) of controlling a torque of the electric machine and (ii) of controlling any torque request.

3. The method according to claim 1, (i) wherein parameters of the filter are set according to a simulation of the behavior of the electric machine and/or the electromechanical system or (ii) wherein parameters of the filter are varied adaptively during operation of the electric machine or (iii) where one or more parameters of the filter belonging to a first group of parameters are set according to a simulation of the behavior of the electric machine and where one or more of parameters of the filter belonging to a second group are varied adaptively during operation of the electric machine.

4. The method according to claim 1, wherein the step of using the feed-forward electromotive force signal in an open-loop control of the electric machine comprises providing the feed forward signal as input to a current control segment in addition to at least one of a requested current derived from a corresponding torque request an electrical angular speed of the at least one electric machine, an actual current of the at least one electric machine.

5. The method according to claim 1, further comprising the step of forwarding control signals to an inverter coupled to the at least one electric machine.

6. An oscillation damping torque control system for an electric machine coupled to at least one torque load and producing an electromotive force, comprising
    a current controller connected to received feedback from the electric machine and configured to apply current control of the electric machine, and
    a filter connected to receive an electromotive force signal derived from actual values of the electromotive force and to provide a feed forward electromotive force signal to the controller, the filter providing a phase shift of the electromotive force signal in a frequency region corresponding to a resonance frequency of the electromechanical system, wherein the current controller is further configured to apply the feed forward electromotive force signal in an open loop control of the electric machine to damp electromechanical oscillations in the electric machine, wherein the actual values of the electromotive force are derived from at least one of:

(i) a calculated magnetic flux of the electric machine, (ii) a calculated electrical angular speed of the electric machine, and (iii) an estimation made by an observer of the state of the electric machine, and wherein the electrical angular speed is calculated from values of a mechanical angular speed of the electric machine and a pole pair number of the electric machine.

7. The system according to claim 6, further comprising a torque control segment configured to receive a requested torque and to transform it into a requested current, and to provide the requested current to the current controller.

8. The system according to claim 6, wherein the electric machine is coupled to one or more torque loads characterized by a mechanical angular speed via a spring-damper system.

9. A computer comprising a computer program stored on a non-transitory computer readable medium adapted to perform a method or for use in a method according to claim 1.

10. The computer according to claim 9 connected to the internet and arranged to download the program to a control unit or one of its components.

11. Computer program product stored on a non-transitory computer readable medium, comprising a program code for use in a method according to claim 1.

* * * * *